Jan. 17, 1928.
L. E. PARSONS
1,656,646
INSTRUMENT BOARD LAMP FOR MOTOR VEHICLES
Filed Feb. 27, 1922
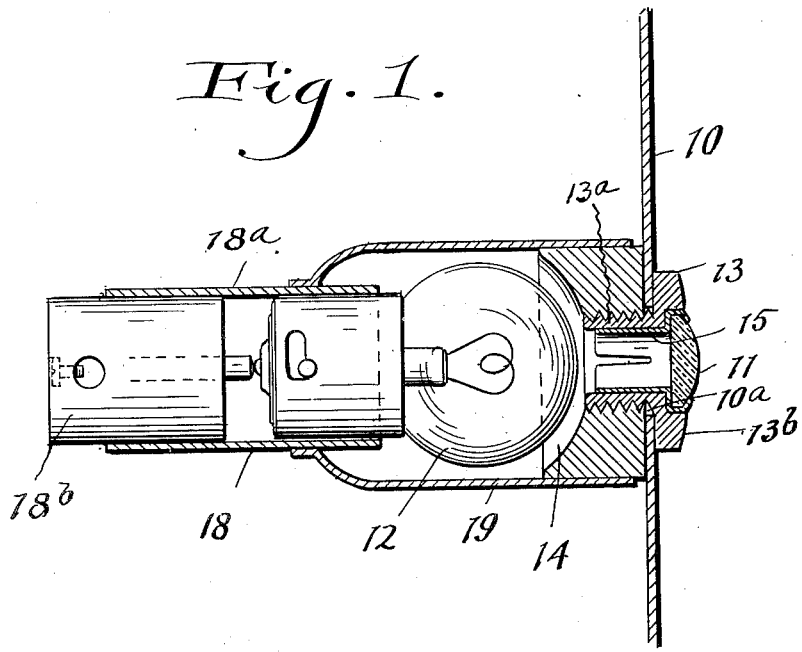
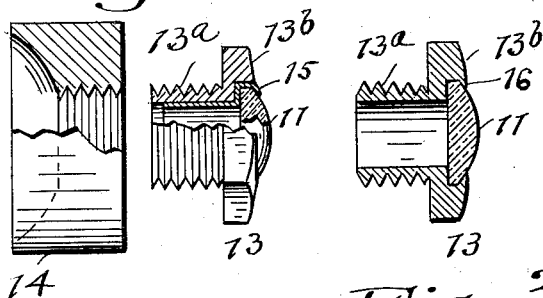
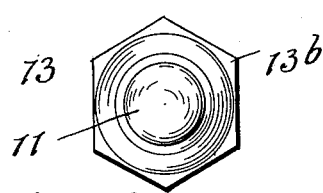
Inventor
Lucius E. Parsons
by
Thurston Kwis & Hudson
attys.

Patented Jan. 17, 1928.

1,656,646

UNITED STATES PATENT OFFICE.

LUCIUS E. PARSONS, OF EAST CLEVELAND, OHIO.

INSTRUMENT-BOARD LAMP FOR MOTOR VEHICLES.

Application filed February 27, 1922. Serial No. 539,401.

This invention relates to a lens and lamp mounting for the instrument board of an automobile, particularly for a small lens and lamp such as utilized as a tell-tale lamp or indicator.

The principal object of the present invention is to provide an efficient and desirable instrument board mounting for a small lens and a small tell-tale lamp adapted especially as an indicating lamp such as in connection with the rear end lamp, whether a tail light or signal lamp, so as to indicate to the driver that the rear lamp is operating, or in connection with any other part of the vehicle.

In accordance with the present invention, the lens and lamp are arranged on the instrument board or cowl board of the vehicle, and they are attached thereto so that the lens is close to and at the front of the instrument board, and the lamp on the rear thereof.

In another aspect the invention relates to the details of the mounting and the manner of connecting the two parts in proper relation to each other, and in the desired relation with respect to the instrument board.

In the accompanying sheet of drawings, Fig. 1 is an enlarged sectional view showing a lamp and lens mounted on the instrument board which is in section; Fig. 2 shows male and female mounting members designed to form clamping engageent with the instrument board and to support the lens and lamp on opposite sides thereof, the male and female members being separated in this view; Fig. 3 is a partial sectional view of the lens holding member showing a slight modification; and Fig. 4 is a face view of the lens and lens holding member.

In the drawings, 10 represents the instrument board or cowl board commonly provided on motor vehicles, and on this board is mounted, in accordance with my invention, the lens 11 and lamp 12, generally used for signaling or indicating purposes, such, for example, as in connection with the tail lamp or rear end signal lamp, or for other purposes. The specific way that the lamp 12 is adapted to be connected up for indicating purposes, or the particular thing that the lamp 12 is to indicate is immaterial to my invention. One specific use of the invention is in connection with a rear end signal system such as constitutes the subject matter of my prior application Serial No. 513,235, filed November 7, 1921.

Preferably a small standard lens 11 is employed such as is commonly employed on telephone switch-boards, in which event the lens is of small size, approximately five-sixteenths of an inch in diameter. Likewise the lamp 12 is preferably a standard automobile lamp such as is employed in dash or tail lamps.

Inasmuch as the lens and lamp constituting the subject matter of this invention are not intended to illuminate any particular thing or space, but to constitute simply a visual indicator, it is desirable that the lens be arranged close to and at the front side of the instrument board so as to be readily visible to the driver, and that the lamp be arranged on the rear side of the instrument board so that the desired signaling or indicating effect is obtained, but with the minimum of space occupied by the device at the front side of the instrument board. By the "front side" of the instrument board I mean the side facing the driver, and by the "rear side" I mean the side toward the front of the vehicle.

The desirable effect or advantage above stated is obtained to a very high degree by this invention, and at the same time the mounting is simple and inexpensive. In accordance with the invention I utilize for supporting the lens and lamp two threaded clamping members, one adapted to support the lens and the other the lamp, and adapted to be screwed together so as to clamp the instrument board between them with the male threaded member extending from one side to the other side of the instrument board. Although the male and female members may be differently formed and arranged than as here shown, in this instance the lens 11 is mounted on the threaded male member 13 which in this case is in the form of a flanged bushing consisting of a hollow or tubular exteriorly threaded part 13$^a$ which is designed to extend through a small hole 10$^a$ of the instrument board, and a flange 13$^b$ which is preferably given a hexagonal or square shape, so that a wrench can be conveniently applied thereto, and in practice is given a finish which will correspond to the finish of the other instruments on the board.

In this instance the female clamping member is in the form of a nut 14 which is screwed onto the hollow threaded shank 13ᵃ of the male member 13. This member which is situated on the rear side of the instrument board is preferably annular in shape and is generally somewhat larger in diameter than the head 13ᵇ of the male member 13. The rear face of the nut 14 has a substantially spherical recess, or is otherwise recessed so as to provide a sufficiently long bearing surface at its exterior to support the lamp in the manner to be explained, and at the same time to permit the lamp proper to be brought up fairly close to the lens 11.

The lens 11 may be fastened to the male member 13 in any suitable manner so as to be located close to and at the front face of the instrument board. It is located centrally of the opening or bore, extending through the threaded shank 13ᵃ, and preferably is seated into an enlargement of this opening located at the front central part of the head 13. I have supported the lens in the member 13 very advantageously by fitting its periphery in a brass retaining shell 15 having a tubular part fitted tightly in the shank 13ᵃ of the member 13. This separate piece or shell 15 is, however, not essential, and the lens may be held in place by setting it into the recess at the front of the head 13ᵇ of the member 13 and by simply peening over the metal forming a retaining flange as shown at 16 in Fig. 3.

Taking up now the lamp and the way it is supported, I wish to say, first, that the lamp 12 is preferably fitted into a standard socket 18, which in the case of a standard automobile lamp includes a metal sleeve 18ᵃ in which is fixed an insulating body 18ᵇ having one or more contacts adapted to be engaged by the contact or contacts of the plug part of the lamp 12. However, I wish to make clear that the details of the lamp and its socket per se form no part of this invention. For the purpose of mounting the lamp securely on the rear side of the instrument board, with the lamp proper in proper relation to the lens 11, I solder or otherwise attach to the sleeve 18ᵃ, a metal tube 19 which has a reduced part secured to the sleeve 18ᵃ and a cylindrical part which projects forwardly beyond the lamp 12 and is fitted in a suitable manner onto the outside of the nut 14. Preferably a friction fit is all that is needed to fasten the tube 19 onto the nut 14, as I have found in practice that when the tube and nut are of the right size, it is only necessary to slide the forward end of the tube onto the outside of the nut with the tube, of course, fitting tightly onto the nut, and when thus fitted, vibration does not shake the tube from the nut. Of course, if desired, a holding device such as a set screw can be utilized to secure the tube onto the nut. When the tube is slipped onto the nut the spherical part of the globe of the lamp extends into the spherically recessed end of the nut substantially as shown, with the lamp, of course, coaxial with the lens.

Thus by this construction the lens and lamp are individually supported, one by the male and the other by the female members of the threaded members which are utilized to clamp the device to the instrument board, with the lens on the front side thereof and the lamp on the rear side. This method or manner of mounting provides on the front face of the dash a neat and attractive device, small in size, and lying close up against the instrument board. Nevertheless, when the lamp 12 is energized, the operator can very readily see the light passing through the small lens so that it serves admirably the intended purpose as an indicator.

As before stated, this lamp can be used for a number of different purposes such as a tell-tale lamp for a tail light, or rear end signal, or as an indicator for other purposes such as for indcating oil, gas or water levels, or any other condition which it may be desirable to indicate.

I do not desire to be confined to the exact details shown, but aim in my claims to cover all modifications which do not involve a departure from the spirit and scope of my invention.

Having described my invention, I claim:

1. The combination with the instrument board of a motor vehicle having an aperture therethrough, of an instrument board lamp including a lens and a lamp proper, a mounting therefor by which the lens is supported at the front of the instrument board and the lamp at the rear thereof, comprising an exteriorly threaded bushing extending through the instrument board with a part at the front thereof carrying the lens, a nut adapted to be screwed onto the bushing so as to clamp the instrument board between it and the bushing, and a casing member mounted on the nut and adapted to support the lamp at the rear of said bushing.

2. The combination with the instrument board of a motor vehicle having an aperture therethrough, an instrument board lamp including a lens and a lamp proper, a mounting therefor by which the lens is supported at the front of the instrument board and the lamp at the rear thereof, comprising an exteriorly threaded bushing extending through the instrument board with a part at the front thereof carrying the lens, and a nut adapted to be screwed onto the bushing so as to clamp the instrument board between it and the bushing, and a sleeve fitted onto the nut, said sleeve surrounding the lamp and secured to the socket portion thereof.

3. In combination with the instrument board of a motor vehicle having an aperture therethrough, a lamp for the instrument board comprising a lens and a lamp proper, a threaded member extending through said aperture and having a part supporting said lens over the aperture and engaging the front of said board, a nut on said threaded member at the rear of the board and engageable with the rear side of the board whereby said board may be clamped between said nut and lens supporting part, and means carried by said nut for supporting the lamp behind the aperture.

4. The combination with an instrument board of a motor vehicle having an aperture therethrough, of a lens, a supporting member for the lens adapted to engage the front face of the board adjacent the aperture and having a part extending through the aperture, a clamping member adapted to engage the rear side of the board, cooperating means on said clamping member and on the extending part of the lens supporting member for adjustably clamping the board between the members and securing the lens over the aperture, and a lamp casing of greater diameter than the aperture carried by said clamping member and adapted to support a lamp behind said aperture.

5. The combination with an instrument board of a motor vehicle having an aperture therethrough, of a lens, a supporting member for the lens adapted to engage the front face of the board adjacent the aperture and having a part extending through the aperture and a part to support said lens over the aperture and coaxial therewith, a clamping member adapted to engage the rear face of the board adjacent the aperture, means on said members for adjustably connecting said clamping member and lens supporting member, whereby said members may be drawn one toward the other to clamp the board between them, and means detachably connected to said clamping member for supporting a lamp at the rear of said instrument board and coaxial with said aperture.

6. The combination with an instrument board of a motor vehicle having an aperture therethrough, of a lens, a supporting member for the lens having means to engage the front face of the board adjacent the aperture and to support said lens over the aperture and coaxial therewith, a clamping member adapted to engage the rear face of the board adjacent the aperture, means on said members for adjustably connecting said clamping member and lens supporting member whereby said members may be drawn one toward the other to clamp the board between them, and a lamp casing of greater diameter than said aperture detachably supported on said clamping member in a position coaxial with said aperture.

In testimony whereof, I hereunto affix my signature.

LUCIUS E. PARSONS.